(12) United States Patent
Bedford

(10) Patent No.: US 7,040,624 B2
(45) Date of Patent: May 9, 2006

(54) GAME WITH MULTI-LEVEL GAME BOARD

(75) Inventor: Jonathan Bedford, Hawthorne, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/286,456

(22) Filed: Nov. 1, 2002

(65) Prior Publication Data

US 2003/0085518 A1    May 8, 2003

Related U.S. Application Data

(60) Provisional application No. 60/340,007, filed on Nov. 1, 2001.

(51) Int. Cl.
  *A63F 3/00* (2006.01)

(52) U.S. Cl. ...................................... 273/241; 273/287

(58) Field of Classification Search ................ 273/241, 273/243, 262, 255, 265, 287, 284, 285, 286, 273/280, 283; D21/335, 336, 337, 347
See application file for complete search history.

(56) References Cited

U.S. PATENT DOCUMENTS

| | | |
|---|---|---|
| 565,450 A | 8/1896 | Gibson |
| 990,918 A | 5/1911 | Stadler |
| 1,430,778 A | 10/1922 | Williams |
| 1,549,610 A | 8/1925 | Reisz |
| 1,819,932 A | 8/1931 | Walden |
| 1,870,395 A | 8/1932 | Zarin |
| 1,992,618 A | 2/1935 | Jeffreys |
| 3,767,201 A | 10/1973 | Harper et al. |
| 3,804,416 A | 4/1974 | Jones et al. |
| 3,947,038 A * | 3/1976 | Archer ....................... 273/254 |
| D242,271 S * | 11/1976 | Harvey |
| 4,046,381 A | 9/1977 | Comeaux |
| 4,130,284 A | 12/1978 | Fuks |
| 4,333,654 A | 6/1982 | Allain |
| 4,349,973 A | 9/1982 | Penick et al. |
| 4,534,565 A * | 8/1985 | Hube .......................... 273/241 |
| 4,570,938 A * | 2/1986 | Ferris et al. ................. 273/243 |
| 4,585,233 A | 4/1986 | Wilson |
| 4,648,601 A | 3/1987 | Carmichael |
| 4,765,627 A * | 8/1988 | Ross .......................... 273/255 |
| 4,781,384 A | 11/1988 | Bois |
| 4,861,040 A | 8/1989 | Peterson |
| 4,883,278 A | 11/1989 | Scott |
| 5,022,681 A | 6/1991 | Penick |
| 5,049,078 A | 9/1991 | Thomsen |
| 5,096,204 A | 3/1992 | Lippman |
| 5,195,750 A | 3/1993 | Courialis |
| 5,213,507 A | 5/1993 | Ozrovitz |
| 5,228,698 A | 7/1993 | Dubarry, Jr. |
| 5,358,252 A | 10/1994 | McPhaul |

(Continued)

FOREIGN PATENT DOCUMENTS

GB         627951         10/1948

*Primary Examiner*—Vishu K. Mendiratta
(74) *Attorney, Agent, or Firm*—Kolisch Hartwell, P.C.

(57) ABSTRACT

A game wherein players move their game pieces across a multi-level playing field while trying to capture target pieces and avoid a chaser piece is described. Moreover, the game may be portable. In some cases, the game apparatus may be carried in a plastic case that resembles a hard-backed book. The game components may be based on an individual chapter from a published children's book or novel.

19 Claims, 2 Drawing Sheets

U.S. PATENT DOCUMENTS

| | | |
|---|---|---|
| 5,415,412 A | 5/1995 | McMahon |
| 5,443,268 A | 8/1995 | Mayfield et al. |
| 5,562,520 A | 10/1996 | Pridonoff et al. |
| 5,630,588 A * | 5/1997 | Gladish ............... 273/265 |
| 5,678,819 A | 10/1997 | Underwood |
| 5,681,199 A | 10/1997 | Morris |
| 5,682,999 A | 11/1997 | Larson |
| 5,704,611 A | 1/1998 | Pierce |
| 6,120,029 A * | 9/2000 | Carmichael et al. ......... 273/260 |
| 6,170,825 B1 | 1/2001 | Pflum |
| 6,203,017 B1 | 3/2001 | Schultz |
| 6,273,422 B1 * | 8/2001 | McGahan ............... 273/241 |

\* cited by examiner

GAME WITH MULTI-LEVEL GAME BOARD

CROSS-REFERENCE TO RELATED APPLICATIONS

This application is based upon and claims priority under 35 U.S.C. § 119(e) to the following U.S. provisional patent application, which is incorporated herein by reference in its entirety for all purposes: Ser. No. 60/340,007 entitled "Book Based Games," filed Nov. 1, 2001.

FIELD OF THE INVENTION

The present invention relates generally to board games, and more specifically to board games that resemble a book when closed, and resemble a children's playset when open. The invention also includes various rules and apparatus for playing a board game, including games played on multiple levels.

BACKGROUND OF THE INVENTION

Examples of board games that resemble a book are disclosed in U.S. Pat. Nos. 2,221,267, 3,880,429, 4,712,673, 4,781,384, 5,356,155, 5,961,149, and 6,203,017, and examples of board games that include multiple levels or room-like portions are disclosed in U.S. Pat. Nos. 3,767,201, 3,804,416, 4,333,654, 4,534,565, 5,195,750, 5,443,268, 5,678,819 and 6,170,825, the disclosures of all of which are incorporated by reference in their entirety for all purposes.

SUMMARY OF THE INVENTION

The present invention includes portable games carried in a plastic case that resembles a hard-backed book. Opening the book unfolds the game board. Various embodiments may be based on an individual chapter from a published children's book or novel.

Preferably, the housing and game board double as a playset, for use with detailed figures and environments.

The present invention further includes rules and apparatus for playing a board game in which players move game pieces on a multi-level game board and attempt to capture target pieces while avoiding chaser pieces.

The advantages of the present invention will be understood more readily after a consideration of the drawings and the Detailed Description.

DETAILED DESCRIPTION AND BEST MODE OF THE INVENTION

The present invention is a game played by at least two players involving strategy and chance. As will be understood, game 210 may incorporate elements from a particular theme or popular cultural phenomenon, such as a book or movie. In such a case, the elements of game 210 may include depictions, shapes, and colors that reflect or exemplify this theme or phenomenon. In particular, game 210 may be based on a particular portion of popular media, such as a chapter of a book or novel.

Figure 1:
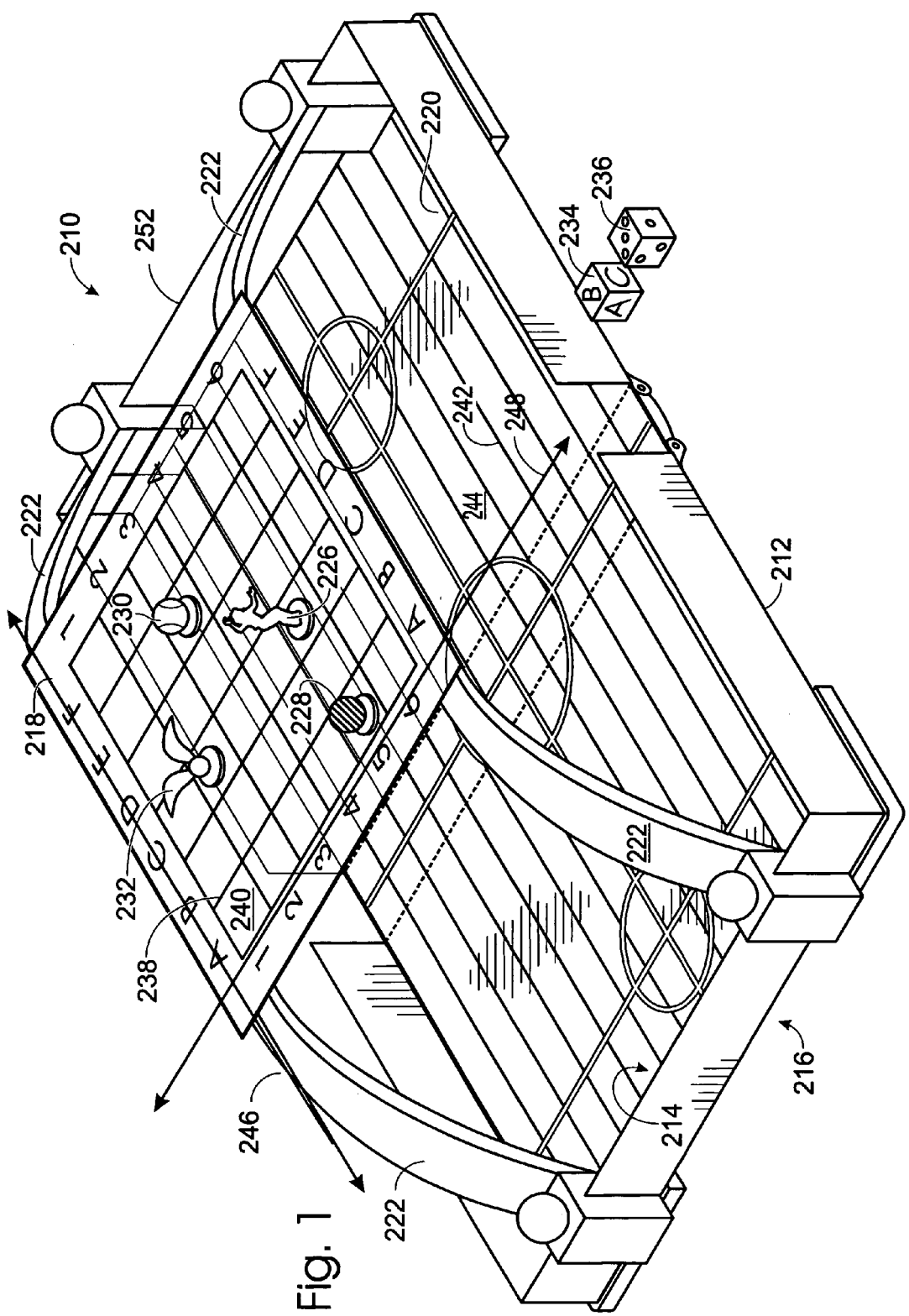
FIG. 1 depicts one embodiment of the game of the present invention, including a housing, multi-level playing surface, and playing pieces.

An exemplary embodiment of game 210 is shown in FIG. 1. Typically, game 210 includes a housing 212 having an inner surface 214 and an outer surface 216. Connected to inner surface 214 are a first playing field 218 and a second playing field 220. As shown, playing field 218 may be connected to playing field 220 by supporting structures 222. Typically playing fields 218 and 220 and supporting structures 222 are connected in such a manner that the assembled pieces can be easily disassembled and reassembled.

Game 210 further includes a number of playing pieces including a player mover 226 for each player, a commonly controlled chaser 228, a commonly controlled target 230, a commonly controlled bonus target 232, and a random number generator, such as dice 234 and 236.

As shown, playing field 218 includes an upper grid 238, which creates a plurality of upper spaces 240. Playing field 220 includes a lower grid 242, which creates a plurality of lower spaces 244.

As stated above, game 210 may be based on a particular piece of popular media such as a book or more. More particularly, game 210 may be based on a portion of the popular media piece such as a book chapter. In such a case, it may be desirable for game 210 to also be used as a play set. As a play set, game 210 may include play items based on those items and situations described in the book or other form of popular media. Furthermore, game 210 may include additional decorative items that are not used in game play according to the rules of the game. In addition, some or all of the items used in game play may be suitable for use as part of the play set.

Figure 5:
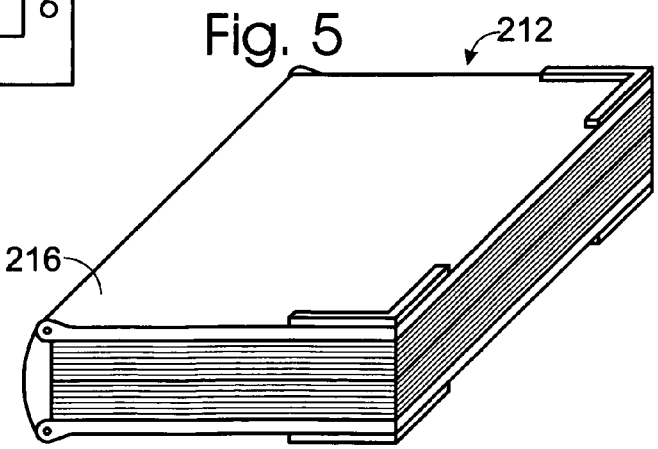
FIG. 5 depicts the housing of FIG. 1 in a closed position.

As stated above, game 210 may further include a housing 212 having an inner surface 214 and an outer surface 216. Typically, housing 212 is adapted to move from an open position, as shown in FIG. 1 to a closed position, as shown in FIG. 5. Generally, playing fields 218 and 220 are accessible for play when the housing is in the open position.

The housing may resemble a book when in the closed position. Furthermore, the housing may be adapted to contain all of the playing components including the playing fields, playing pieces and any decorative items not used in game play when in the closed position.

In one embodiment, the present invention provides rules for using the above-described apparatus wherein players may move their game pieces on the first and second playing fields while capturing target pieces and avoiding the chaser piece. The rules may specify that each turn the target piece may be moved one space. The rules may further specify that each turn the chaser piece may be moved one space. Typically target pieces are captured when the player mover is within a certain pre-specified range of a target piece, for example within one space. A player may score when his or her player mover is within a predefined range of a bonus target. However, when a chaser piece is within a pre-specified range of a player mover, the player owning the player mover is usually assessed some type of penalty, such as having their player mover moved to a different grid.

Typically, players initially place and then move the playing pieces on the upper and lower grids by rolling the dice and moving the pieces according to the die roll. In one embodiment, grids 238 and 242 include markings denoting the x-axis 246 and y-axis 248 of each grid, thus each space on a given grid can be identified by an x,y-coordinate pair. The indicia on die 234 will typically correlate with the x-axis grid markings and the indicia on die 236 will typically correlate with the y-axis grid markings. Accordingly, when dice 234 and 236 are rolled, the result is an x-coordinate from die 234 and a y-coordinate from die 236.

A playing piece may be initially placed on a grid by rolling the dice to obtain x- and y-coordinates and placing the playing piece on the space correlating to the x- and y-coordinates rolled. In some embodiments movement of the playing piece may be effected by ascertaining the starting x- and y-coordinates of the piece, rolling the dice and moving the playing piece to a second position by selecting between the x,y-coordinate position defined by the x-coordinate from the starting position and the y-coordinate from die 236 or the x,y-coordinate position defined by the y-coordinate from the starting position and the x-coordinate from die 234.

The bonus target may be placed on the first playing surface after game play has been initiated. A random number generator may include bonus target indicia. For example, if dice are used as the random number generator, the dice may include bonus target indicia on one or more faces of each die. The bonus target may initially be placed on the first playing surface when a dice role results in both dice displaying the bonus target indicia. Moreover, the start space for the bonus target may be determined by one of the methods described above, for example, a first die may be rolled to obtain an x-coordinate, a second die may be rolled to obtain a y-coordinate and the bonus target may be placed on the upper space defined by the x-coordinate and y-coordinate. Moreover, the bonus target may be moved by identifying a starting x,y position of the space the bonus target occupies, wherein the starting position has a first x-coordinate and a first y-coordinate, rolling a first die to obtain a second x-coordinate, rolling a second die to obtain a second y-coordinate, and moving the bonus piece to a second x,y position by selecting between: an x,y-coordinate position defined by the first x-coordinate and the second y-coordinate or an x,y-coordinate position defined by the second x-coordinate an the first y-coordinate.

As stated above, the game may be based on a well-known popular culture phenomenon, such as a book or movie. Accordingly, the example below is based on the popular children's book Harry Potter and the Sorcerer's Stone, by J. K. Rowlings. Accordingly, an example of a set of rules for a game constructed in accordance with an embodiment of the present invention follows:

Example I

Harry Potter and the Sorcerer's Stone™

QUIDDITCH™

Chapter Game

| CONTENTS | |
|---|---|
| 1 Mini Game Book (Housing 212) | 1 Bludger (chaser 228) |
| 1 Quidditch Grid (First playing field 218) | 1 Golden Snitch (bonus target 232) |
| 1 Harry Potter Mover (Red Cloak) (226) | 1 Six-Sided Die w/numbers (236) |
| 1 Terence Higgs Mover (Green Cloak) (Not shown) | 1 Six-Sided Die w/letters (234) |

| -continued | |
|---|---|
| CONTENTS | |
| 1 Quaffle (Red) (target 230) | 4 Supports (222) 10 Customer Applied Labels (Not shown) |

SET UP
1. Unfold the game board 210
2. Affix 1 label to each of the four supports 222, 2 scoring labels onto the Quidditch grid 218, 1 Golden Snitch label 250 to the corner of A and F on the lettered die 234, 1 and 6 on the numbered die 236.
3. Place the four supports 222 on the walls 252 of the game, lining them up with the indications (not shown) on the game board 210.
4. Place the Quidditch grid 218 on the supports 222. Secure firmly to supports.
5. Both players roll the numbered die 236. The player with the highest roll plays with the Harry Potter mover 226. The other player is given the Terence Higgs mover (not shown).
6. Starting with Harry, each player rolls both dice and places their Mover on the Quidditch Grid 218 in the position indicated by the dice.
7. The Harry Potter player then rolls both dice and places the Quaffle 230 on the Quidditch Grid 218 in the position indicated by the dice.
8. Finally, the Terence Higgs player rolls both dice and places the Bludger 228 on the Quidditch Grid 218 in the position indicated by the dice.
9. Set the Golden Snitch 232 aside until later.

OBJECT

Have the most points when the Golden Snitch is caught or be the first player to reach 300 points.

LET'S PLAY
1. The Player with the Harry Potter Mover goes first.
2. On your move, you're attempting to get within scoring distance of the Quaffle 230 or to avoid the Bludger 228. Roll both dice. You may choose to move to either the letter OR the number position on the Grid, according to your roll on the dice.

Example

Figure 2:
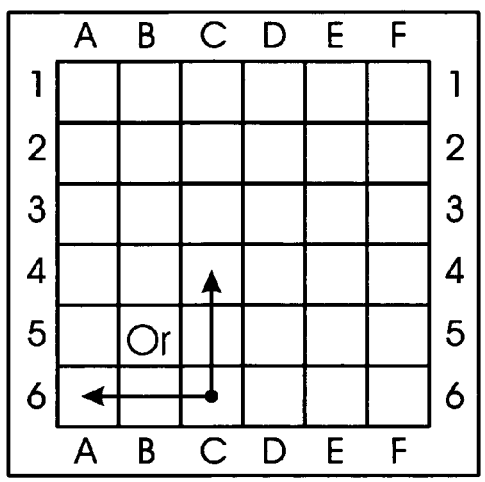
FIG. 2 is demonstration of how playing pieces may be moved according to exemplary rules of the game.
Figure 3:
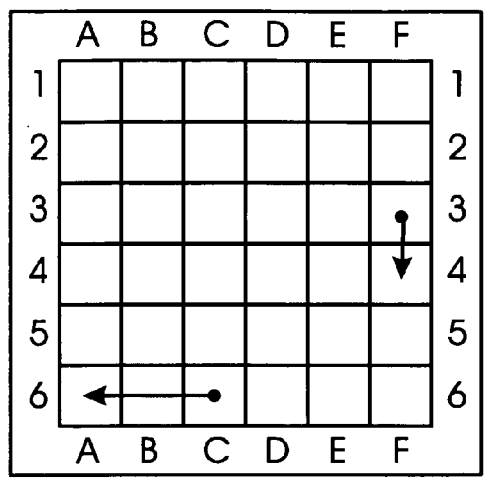
FIG. 3 is another demonstration of how playing pieces may be moved according to exemplary rules of the game.

The Harry Potter Mover began play on position C-6 on the Quidditch Grid. You roll the dice and get A-4. That means that you can place the Harry Potter Mover on either A-6 or C-4. (See, e.g. FIG. 2)
3. If your current position matches one of the rolls on the dice, you can choose not to move your piece.

Example

If Harry Potter is on position D-3 and then you roll A-3 on the dice, you can choose to move Harry to A-3 or stay at D-3.
4. After your piece has moved, move either the Quaffle 230 or the Bludger 228 one space in any direction except diagonally.
5. If your Mover is within one space of the Quaffle 230 (including diagonally), you score! Receive 10 points. You can only score once with the Quaffle 230 on your turn.

6. If any Mover is within one space of the Bludger 228 (including diagonally), then that player is knocked to the ground (i.e moved to playing field 220) (See THE BLUDGER below).
7. If your mover is within one space of the Quaffle 230 and the Bludger 230 you score before being knocked to the ground.
8. Any piece on the Quidditch Grid 218 can share a space with one or more pieces. Of course, if you share a space with a Bludger 228, you will still get Bludgered and knocked to the ground.
9. Play continues until the Golden Snitch 232 is caught (See GOLDEN SNITCH below) OR a player reaches 300 points. In the unlikely event of a tie, the next player to score wins the match.

THE BLUDGER
1. If any Mover 226 is within one space of the Bludger 228, then that Mover is knocked off his broom and down to the ground.
2. You will notice a grid 220 on the ground corresponding to the Quidditch grid 218. Place your Mover on the ground grid 220 right underneath the space you were on when you were Bludgered.
3. On your move, roll the NUMBERED DIE 236 only. You may move as many spaces on the ground grid 220 as indicated on your numbered die except diagonally.
4. You may NOT move the Bludger 228, Quaffle 230, or Golden Snitch 232. You cannot score while you are on the ground grid 220, even if the Quaffle 230 or Golden Snitch 232 is right above you.
5. You can return to the Quidditch grid 218 by reaching any of the four corner squares on the ground grid 220 (A1, A6, F1, or F6). The next move will place you on the corresponding corner squares A1, A6, F1 or F6 on the Quidditch Grid 218.
6. If you moved under the ground grid corner square with some movement still leftover from your die roll, then you can immediately move up to the corresponding corner square on the Quidditch Grid 218. You may NOT move any farther than the corner grid on your turn. However, once you are on the Quidditch Grid 218, you may move the Bludger 228 or Quaffle 230 and probably score, just like a normal turn.

Example

Your mover, Harry Potter, has been Bludgered and is currently at position C-4 on the ground grid 220. On his turn, you roll a 3 on the numbered die. You move Harry to C-3, C-2, and then C-1 not quite enough to get you off the ground!But on Harry's next turn, you roll a 6!You move to B-1 and then to A-1 (a corner square). Since you have 4 "leftover" moves, you can now place Harry back on the Quidditch grid 218. Although you can't move Harry any more this turn, you can move the Bludger 228 or the Quaffle 230 as in normal play.

The Golden Snitch
1. If two Golden Snitch symbols 250 appear in a single dice roll, then the Golden Snitch 232 appears (i.e. is placed) on the board by the player who rolled the dice. The dice rolls that will do this are A1, A6, F1, and F6.
2. When the dice indicate that the Snitch will appear, you first take your normal turn. Then, at the end of your turn, roll the dice again and place the Golden Snitch 232 on the Quidditch Grid 218 in the position indicated by the dice. Please note that since the Snitch 232 came into play at the end of the turn you cannot score with it, even if it ends up appearing right next to you.

Example

At the beginning of Harry's turn, he is at A-4 and you roll an F-6. Spotting the two Golden Snitches on the dice, you know the Snitch will show up this turn. Your turn continues as normal (you move Harry to F-4)—no sight of the Snitch yet!At the very end of the turn, after moving the Bludger 228 or Quaffle 230 and scoring (hopefully), you roll the dice again. An E-4!The Snitch is right next to you!Unfortunately, you can't score on the Snitch right now. It must have flown past you too quickly . . .
3. After its initial appearance, the Golden Snitch 232 moves on each player's move. On your move, roll both d ice as normal. You may choose to move to either the letter OR the number position on the grid. Once you have made your choice, the Golden Snitch uses the other die for its movement.

Example #1

Figure 4:
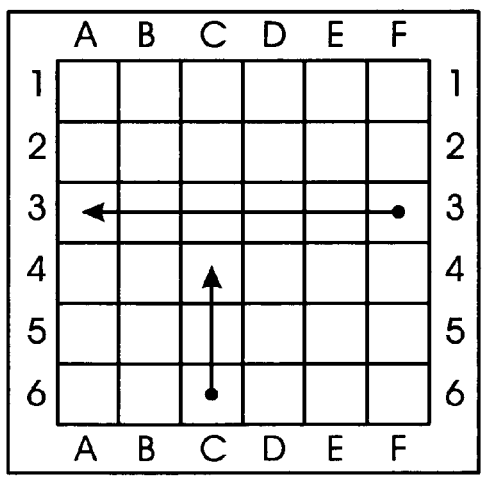
FIG. 4 is another demonstration of how playing pieces may be moved according to exemplary rules of the game.

It's the middle of the game and the Harry Potter Mover is back on position C-6 on the Quidditch Grid. The Golden Snitch is way over on F-3. You roll the dice and get A-4. If you chose to move to A-6, the Golden Snitch would then immediately move to F-4. (See. FIG. 4) If you chose instead to go to C-4, the Snitch would go to A-3. (See, FIG. 5)

Example #2

It's the middle of the game and the Harry Potter Mover is back on position E-6 on the Quidditch Grid. The Golden Snitch is way over on F-3. You roll the dice and get E-5. You choose to leave the Harry Mover on E-6 and move the Snitch to F-5, thus catching the Snitch.
4. The Golden Snitch is caught if anyone ends up within one space of it (including diagonally). This ends the game and gives the player who caught it 150 points.
5. Once the Golden Snitch 232 is on the board, a roll of A1, A6, F1, or F6 will cause the Snitch to exit (i.e be removed from) the board. At that point the Golden Snitch 232 exits the Quidditch Grid 218 at the end of the turn.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

Inventions embodied in various combinations and subcombinations of features, functions, elements and/or properties may be claimed in this or a related application. Such claims, whether they are directed to a different invention or directed to the same invention, whether different, broader, narrower or equal in scope to any original claims, are also regarded as included within the subject matter of the inventions of the present disclosure.

What is claimed is:

1. A method for playing a board game comprising:
providing game pieces including one or more individually controlled player movers and one or more commonly controlled pieces;
providing a first playing surface having a plurality of upper spaces defined by an x-axis and a y-axis,
providing a second playing surface having a plurality of lower spaces defined by an x-axis and a y-axis, wherein the first playing surface is positioned above and parallel to the second playing surface;
taking turns moving a plurality of playing pieces on the first and second playing surfaces, wherein each turn includes:
moving an individually controlled player mover based on the outcome of a random number generator; and
moving a commonly controlled playing piece, where the commonly controlled playing piece may be a chaser piece, a target piece, or a bonus target piece;
moving the player mover from the first playing surface to the second playing surface when the chaser piece is within a predefined range of the player mover; and
scoring when the player mover is within a predefined range of the target piece.

2. The method of claim 1 wherein the first playing surface includes a grid having a plurality of upper spaces defined by an x-axis and a y-axis, and the second playing surface includes a grid having a plurality of lower spaces defined by an x-axis and a y-axis.

3. The method of claim 2 wherein the predefined range for scoring is one space.

4. The method of claim 2 wherein the predefined range for removing is one space.

5. The method of claim 2 further comprising:
placing the player mover in a starting position on the first or second playing surface by:
rolling a first die having indicia corresponding to the x-axes of the first and second playing fields to obtain an x-coordinate;
rolling a second die having indicia corresponding to the y-axes of the first and second playing fields to obtain a y-coordinate; and
placing the player mover in a space on the first or second playing field defined by at least one of the x-coordinate and y-coordinate obtained by rolling the dice.

6. The method of claim 5 further comprising:
placing the target in a starting position on the first playing surface by:
rolling a first die having indicia corresponding to the x-axes of the first and second playing fields to obtain an x-coordinate;
rolling a second die having indicia corresponding to the y-axes of the first and second playing fields to obtain a y-coordinate; and
placing the target in the space on the first playing field defined by the x-coordinate and y-coordinate obtained by rolling the dice.

7. The method of claim 6 further comprising:
placing the chaser in a starting position on the first playing surface by:
rolling a first die having indicia corresponding to the x-axes of the first and second playing fields to obtain an x-coordinate;
rolling a second die having indicia corresponding to the y-axes of the first and second playing fields to obtain a y-coordinate; and
placing the chaser in the space on the first playing field defined by the x-coordinate and y-coordinate obtained by rolling the dice.

8. The method of claim 2 wherein the step of moving the player mover is accomplished by:
identifying the playing surface and a starting x,y position of the player mover, wherein the starting x,y position includes a first x-coordinate and a first y-coordinate;
rolling a first die to obtain a second x-coordinate;
rolling a second die to obtain a second y-coordinate; and
moving the player mover to a second x,y position on the identified playing surface by selecting between:
an x,y-coordinate position defined by the first x-coordinate and the second y-coordinate; or
the x,y-coordinate position defined by the second x-coordinate and the first y-coordinate.

9. The method of claim 8 wherein the step of moving the target piece is performed after moving the player mover.

10. The method of claim 8 wherein the step of moving the chaser piece is performed after moving the playing piece.

11. The method of claim 2 wherein the rules specify that each turn the target piece may be moved one space.

12. The method of claim 2 wherein the rules specify that each turn the chaser piece may be moved one space.

13. The method of claim 2 further comprising scoring when the player mover is within a predefined range of a bonus target.

14. The method of claim 13 wherein the bonus target is placed on the first playing surface after game play has been initiated.

15. The method of claim 14 wherein the random number generator may generate a result indicating that the bonus target is to be placed on the first playing surface.

16. The method of claim 15 wherein the random number generator is a pair of dice and wherein bonus target indicia is included on one or more faces of each of the dice.

17. The method of claim 16 wherein the bonus target is initially placed on the first playing surface when a dice role results in both dice displaying the bonus target indicia.

18. The method of claim 17 wherein the starting space for the bonus target is determined by:
rolling a first die to obtain an x-coordinate;
rolling a second die to obtain a y-coordinate; and
placing the bonus target in the upper space defined by the x-coordinate and y-coordinate.

19. The method of claim 17 wherein the bonus target is moved by:
identifying a starting x,y position of the space the bonus target occupies, wherein the starting position has a first x-coordinate and a first y-coordinate;
rolling a first die to obtain a second x-coordinate;
rolling a second die to obtain a second y-coordinate;
moving the bonus piece to a second x,y position by selecting between:
an x,y-coordinate position defined by the first x-coordinate and the second y-coordinate; or
an x,y-coordinate position defined by the second x-coordinate and the first y-coordinate.

* * * * *